May 28, 1957 T. T. REMBUSCH 2,793,402
RACING APPARATUS
Filed Nov. 2, 1954 2 Sheets-Sheet 2

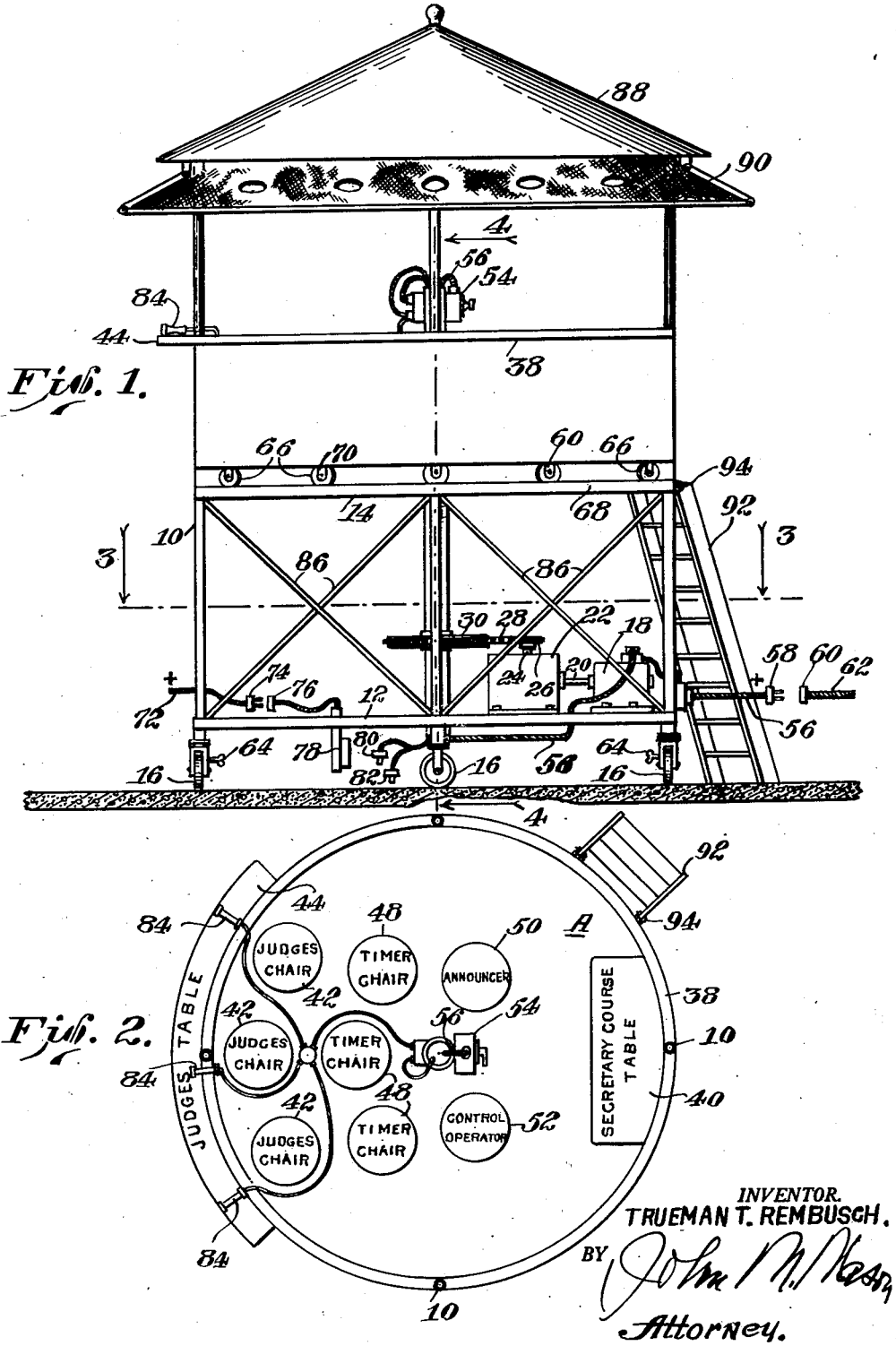

INVENTOR.
TRUEMAN T. REMBUSCH.
BY
Attorney.

United States Patent Office 2,793,402
Patented May 28, 1957

2,793,402
RACING APPARATUS
Trueman T. Rembusch, Franklin, Ind.

Application November 2, 1954, Serial No. 466,336

6 Claims. (Cl. 20—2)

This invention relates to an apparatus for observing races such as horse races, either flat races or harness races, dog races, or other types of races. The apparatus will be described for use with horse racing, but it will be understood that many types of racing are included by this terminology.

The principal object of the invention is the provision of an apparatus whereby the judges or timers and other officials may face the position in which the horses are running by means of a rotating platform having positions for the various officials who must judge the race.

Another object is to provide an apparatus including a rotating platform on which the officials may be stationed, with means for varying the speed of rotation of the platform, whereby the said officials may at all times face that portion of the track on which the horses are running.

A further object is to provide an apparatus having a rotating platform on which the judges are stationed which is under the control of an operator on the platform, whereby the direction of movement of the rotating platform and its speed may be accurately controlled, in order that the judges and timers may face the portion of the track on which the horses are running, particularly at the start and at the finish of the race.

Yet another object is for an apparatus which may be moved from one position to another about the track and having telephone and annunciator connections in order that the officials may promptly announce their decisions to those attending the race.

Other objects will appear hereinafter throughout the specification.

In the drawings:

Figure 1 is a side elevation of the apparatus of this invention;

Figure 2 is a top plan view of the structure shown in Figure 1 with the roof and awning removed;

Figure 3:
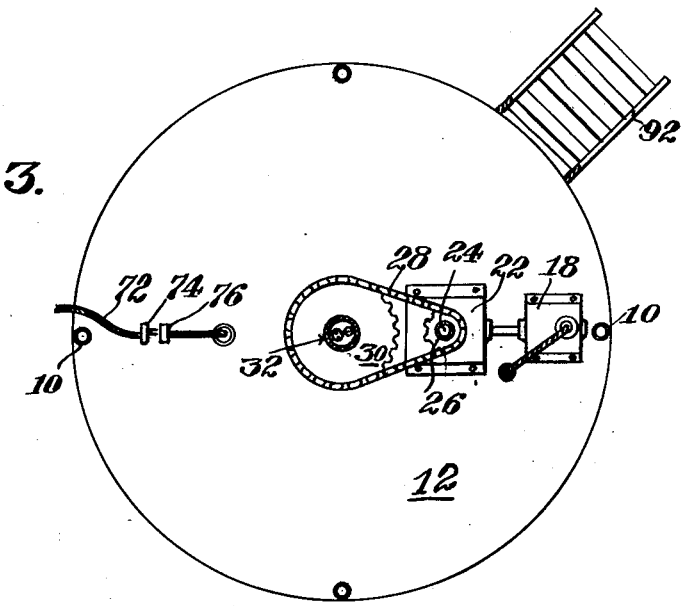
Figure 3 is a horizontal section on the line 3—3 of Figure 1.

The apparatus of the present invention insures that the judges and timers, as well as other officials of horse races are provided with an unobstructed view of the horses and drivers at all times during the running of the race. In this manner, the drivers, in the case of a harness race, or the riders of the horses in flat races, may be closely observed to determine whether any irregularities occur or whether regulations are properly conformed to by the drivers or riders, as the case may be.

The apparatus consists generally of a circular platform mounted on wheels which rotate about a circular track on a base, the apparatus may be caused to move from one portion of the track to another. The circular platform is driven by a reversible motor, the speed of which may be controlled so that the circular platform may rotate at a gradually accelerating speed, or a gradually decelerating speed, according to the speed of approach or departure of the horses on the track, the said speed of rotation of the platform being controlled by the control operator who preferably is located on the circular rotating platform.

Ordinarily, the apparatus will be positioned at the finish line with the platform rotated to a position so that the judges and timers are facing the starting point of the race. As the horses leave the starting point, the operator of the control unit regulates the rheostat so as to start the platform rotating in the direction the horses are running, and by varying the position of the rheostat control unit, controls the speed of the motor and the platform driven thereby. In this manner, the position of the judges and timers may be such that they face the horses running in the race at all times during the race.

The rate of rotation of the motor and the platform will, of course, be much more rapid at the start of the race when the horses are nearest to the judges, and the speed of the motor and platform are gradually decreased as the horses round the first and second ninety degree turns, and the speed is gradually increased as the horses round the third and fourth ninety degree turns, the platform reaching its maximum rotation rate as the horses reach the finish line. In the case of a false start, the operator, by placing the driving motor control unit in reverse position, can return the platform to the starting position.

The above statement of operation assumes that the horses will start and finish at substantially the same point. However, if the horses start at a different point along the track than the point where the finish line is located, one of two procedures may be used. The apparatus may be located at the start of the race and pulled or otherwise moved to the finish of the race during the running of the race. The second mode of operation is that of positioning the apparatus at the finish of the race with the judges and timers facing the start of the race. The operator may then start the rotation of the platform at the start of the race, and increase or decrease the rate of rotation of the platform in such manner that the judges and timers may always be in a position facing the horses as they progress around the track.

Referring to the drawings, A indicates the apparatus as a whole. The apparatus consists of a base 10 having a lower platform 12 and an upper platform 14. The base is provided with a plurality of wheels 16 which are adapted to roll along the ground when the apparatus is pulled or hauled by horses or a tractor. A suitable motor, not shown, may be provided for driving an oppositely located pair of wheels 16. These wheels are located preferably at four points about the circular base. Mounted on the lower platform is an electric motor 18 having a drive shaft connection 20 to a reduction gear mechanism located in the gear box 22. Also, as seen in Figure 1, there is a vertical stub shaft 24 extending upwardly from the box 22 having on its end a driving gear 26. This gear drives chain 28 which is connected to the driven gear 30. Gear 30 is fast on vertical shaft 32. Rotatably mounted on the upper end of the shaft 32 and splined thereto is the rotating platform having a floor 36 and a railing 38. Mounted adjacent one portion of the railing is the table 40 customarily used by the secretary of the race course.

As noted particularly in Figure 2, there are a plurality of judges' chairs indicated by the numeral 42. These chairs also are located adjacent the railing 38 and extending outwardly from the railing is the judges' table 44. The platform 12 and shaft 32 may be provided with a radial bearing (not shown) between them.

Mounted on a series of pedestals 46 are the timers' chairs 48. Located adjacent the geometrical center of the rotating platform and mounted thereon is the announcer's chair 50 and chair 52 of the control operator. Rigidly mounted on the shaft 32, so as to rotate therewith, is the rheostat control 54 having a control handle 56.

Figure 4:
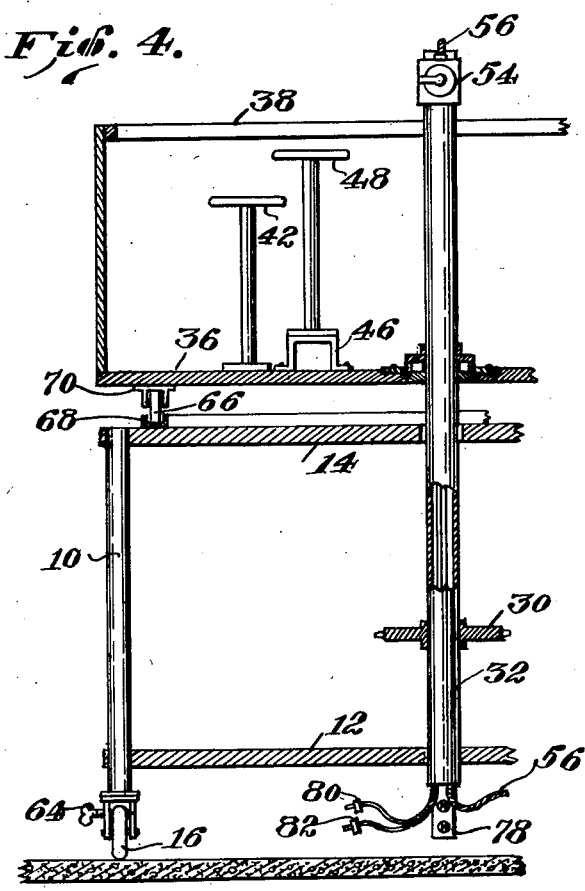
Figure 4 is an enlarged fragmentary vertical section on the line 4—4 of Figure 1, with the central shaft shown in full lines except where broken away.

Referring to Figures 1 and 4, it will be noted that the control leads for the motor 18 extend therefrom through the hollow vertical shaft 32 to the rheostat 54. The motor is provided with wires 56 leading to a plug 58 which may be connected to a socket 60, which latter is connected by wiring 62 to an outside source of current such as the usual 110-volt, 60-cycle current from a suitable source such as a city power plant. It will be understood that any number of said sockets 60 and wiring connections 62 may be located around the track so that the motor 18 may be plugged in at any number of positions adjacent the inside rail of the track, as it is preferred to locate the apparatus in the oval of the race track.

Referring again to the wheels 16, it will be appreciated that either oppositely located pair of wheels may be locked in position by suitable locking means such as shown at 64. These wheels 16 are mounted to swivel but may be locked in position to prevent swivelling by the locking means 64.

The floor 36 and all parts supported thereby are mounted on a plurality of circumferentially positioned rollers 66 which rotate in the circular track 68 mounted on the upper or top surface of the upper platform 14. These rollers are freely turnable in the bracket 70 that are suitably mounted on the underside of the floor 36 as shown in Figures 1 and 4. Positioned at various points about the track are the annunciator and microphone connections, one of which is located at 72 in Figure 1. These may be connected by the plug and socket connectors 74 and 76 to the stationary socket member 78, into which may be connected the plugs 80 and 82 which are provided with suitable lead-in wires that extend upwardly through the hollow vertical shaft 32 to positions on the platform to annunciators 84 whereby one of the officials stationed on the platform may make announcements both as to the progress of the race and of the results of the race. These wiring connections may also include telephone circuits with telephones, not shown, located on the platform in order that the judges and other officials stationed thereon may communicate with officials in the clubhouse and at other places along the track.

The judges', timers', announcers' and control operator's chairs are preferably of the rotating stool type in order that they may be rotated by anyone of these officials.

The location of the timers' stools higher than the judges' chairs, as shown in Figure 4, enables the timers to look over the heads of the judges, thereby providing unobstructed views for both the judge and timers. While it is not shown, both the control operators' and announcers' stools may be higher than either the timers' chairs or the judges' chairs so that they may have an unobstructed view of the track over the heads of both the judges and the timers.

As noted in Figures 1 and 4, the upper and lower platforms of the base 10 are connected to each other by the braces 86 that are arranged circularly around the base.

The electric control box or rheostat 54 is of standard type providing a suitable arrangement whereby when the lever 56 is rotated in one direction, the speed of the motor is gradually increased as resistance is cut out, and when the handle is rotated in the opposite direction, resistance is cut out but the motor is rotated in reverse, so as to rotate the platform in the opposite direction.

The platform is provided with a suitable roof 88 which supports an awning 90 that protects the officials from the elements. It is to be further understood that the circular space between the railing and the roof, and the railing and the floor, may be enclosed by a circular glass window, not shown, in order to further protect the officials from the elements, and to permit the installation of air conditioning equipment, not shown, if desired.

As shown in Figures 1 and 3, the platform is provided with a pivoted ladder 92 that is pivotally connected to the platform 14 at 94. When the apparatus is being moved from place to place, the ladder may be swung on its pivot and hooked by suitable means, not shown, to the roof 88 or awning 90.

The above description and drawings disclose a single embodiment of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

I claim:

1. A racing apparatus for use at races, comprising a base, wheels on said base, said base having a circular track, a central shaft extending upwardly through said base, motor means on said base drivingly connected with said central shaft, a rotary platform fixed to said central shaft, and a plurality of rollers fixed to said platform and rotatable on said track, a plurality of freely rotatable seats whereby said seats may be rotated as said platform rotates, said seats being arranged on said platform, and control means for said motor accessible from said platform whereby to control the rate of rotation of said platform on said base, whereby race course officials on said platform may observe the progress of the race at a race course, as said platform is rotated and the speed thereof is controlled by said control means.

2. A racing apparatus for use at races, comprising a base, swivel wheels on said base, said base having a circular track, a central shaft extending upwardly through said base, motor means on said base drivingly connected with said central shaft, a rotary platform fixed to said central shaft, and a plurality of rollers fixed to said platform and rotatable on said track, a plurality of freely rotatable seats whereby said seats may be rotated as said platform rotates, said seats being arranged on said platform, and control means for said motor accessible from said platform whereby to control the rate of rotation of said platform on said base, a ladder, means pivotally mounting one end of said ladder on said base whereby said ladder may be removed from a ground engaging position to a position whereby its other end may be retained by said rotary platform.

3. A racing apparatus for use at races, comprising a base, wheels on said base, a central shaft, a platform drivingly mounted on said central shaft, a reversible electric motor drivingly connected to said platform whereby said platform may be rotated in either direction, said base and platform comprising a plurality of relatively rotatable members, a track on one of said members, a plurality of rollers fixed to said other member and rotatable on said track, a plurality of seats arranged on said platform, certain of said seats being higher than others of said seats, and control means for said motor accessible from said platform whereby to control the rate of rotation of said platform on said base.

4. A racing apparatus for use at races, comprising a base, swivel wheels on said base, a central shaft, a platform drivingly mounted on said central shaft, reversible electric motor drivingly connected to said platform whereby said platform may be rotated in either direction, said base and platform comprising a plurality of relatively rotatable members, a track on one of said members, a plurality of rollers fixed to said other member and rotatable on said track, a plurality of seats arranged on said platform, certain of said seats being higher than others of said seats, and control means for said motor accessible from said platform whereby to control the rate of rotation of said platform on said base, whereby race course officials on said platform may observe the progress of the race at a race course, as said platform is rotated and the speed thereof is controlled by said control means.

5. A racing apparatus for use at races, comprising a base, wheels on said base, a central shaft, a platform drivingly mounted on said central shaft, a reversible electric motor drivingly connected to said platform whereby said platform may be rotated in either direction, said base and platform comprising a plurality of relatively rotatable members, a track on one of said members, a plurality of rollers fixed to said other member and rotatable on said track, a plurality of seats arranged on said platform, certain of said seats being higher than others of said seats, control means for said motor accessible from said platform, said control means being mounted on said central shaft whereby to control the rate of rotation of said platform on said base, and electrical connections extending from said motor adapted to be connected to a source of electrical potential.

6. A racing apparatus for use at races, comprising a base, swivel wheels on said base, a central shaft, a platform drivingly mounted on said central shaft, a reversible electric motor drivingly connected to said platform whereby said platform may be rotated in either direction, said base and platform comprising a plurality of relatively rotatable members, a track on one of said members, a plurality of rollers fixed to said other member and rotatable on said track, a plurality of seats arranged on said platform, certain of said seats being higher than others of said seats, control means for said motor accessible from said platform, said control means being mounted on said central shaft whereby to control the rate of rotation of said platform on said base, and electrical connections extending from said motor adapted to be connected to a source of electrical potential.

References Cited in the file of this patent

UNITED STATES PATENTS

| 773,292 | MacDonald et al. | Oct. 25, 1904 |
| 1,343,794 | Sevczov | June 15, 1920 |
| 1,428,139 | Brown | Sept. 5, 1922 |

FOREIGN PATENTS

| 651,918 | Great Britain | Apr. 11, 1951 |